United States Patent [19]

Saito et al.

[11] 4,325,858

[45] Apr. 20, 1982

[54] AQUEOUS DISPERSION TYPE COATING COMPOSITIONS WITH AN IMPROVED VIBRATION-DAMPING CHARACTERISTIC

[75] Inventors: Koichi Saito; Osamu Ohara, both of Kurashiki, Japan

[73] Assignee: Kuraray Company, Limited, Kurashiki, Japan

[21] Appl. No.: 178,592

[22] Filed: Aug. 15, 1980

[30] Foreign Application Priority Data

Jun. 16, 1979 [JP] Japan ................................. 54-104718

[51] Int. Cl.³ ............................................. C08L 23/06
[52] U.S. Cl. .................... 524/524; 524/449; 525/196
[58] Field of Search ................. 260/29.6 R, 29.6 XA, 260/29.6 RB

[56] References Cited

U.S. PATENT DOCUMENTS

| | | | |
|---|---|---|---|
| 3,706,696 | 12/1972 | Bernett | 260/29.6 E |
| 3,915,917 | 10/1975 | Weignt | 260/29.6 R |
| 4,205,041 | 5/1980 | Hymes | 260/29.6 RB |

*Primary Examiner*—Paul R. Michl
*Attorney, Agent, or Firm*—Oblon, Fisher, Spivak, McClelland & Maier

[57] ABSTRACT

There is provided an aqueous dispersion type vibration-damping coating composition containing, as essential components thereof, (a) a polyvinyl acetate emulsion, (b) a polyethylene in finely divided particulate or emulsion state and (c) a flaky inorganic powder. When this composition is applied to the surface of a structural member which could be source of noise or vibrations, the coating composition displays a high vibration-damping effect over a broad temperature range from low to high temperatures and is excellent in resistance to water, heat and weathering.

1 Claim, No Drawings

AQUEOUS DISPERSION TYPE COATING COMPOSITIONS WITH AN IMPROVED VIBRATION-DAMPING CHARACTERISTIC

BACKGROUND OF THE INVENTION

1. Field of the Invention

This invention relates to aqueous dispersion type vibration-damping coating compositions. More particularly, this invention relates to a new aqueous dispersion type vibration-damping ternary coating composition containing, as essential components thereof, (a) a polyvinyl acetate emulsion, (b) a polyethylene in finely divided particulate or emulsion state and (c) a flaky inorganic powder.

2. Description of the Prior Art

The hitherto-known methods of preventing noise and vibrations in cars, boats, buildings, etc. include the method of affixing a vibration-damping sheet or board to the wall, floor or other surfaces of the building, machine or machine component which may be a source of noise and vibrations and the method of coating such surfaces with a vibration-damping coating material. These methods have been practiced, though to a limited extent.

Such sheets and boards and coating materials are usually based on rubber or asphalt. However, while such materials may exhibit satisfactory damping performance in the neighborhood of atmospheric temperature, they have the disadvantage that said particular characteristic deteriorates considerably at reduced and elevated temperatures. Moreover, prolonged exposure to an elevated temperature results in running, sagging or blistering of the coating while the coating film may peel at low temperature. Because of these and other drawbacks, the conventional materials cannot be successfully applied to areas involving prolonged exposure to high temperature, such as the engine rooms of cars and marine craft, but have found application only in limited areas of use.

Meanwhile, various vibration-damping compositions based on synthetic resin and inorganic filler components have been proposed in recent years. While these materials are superior to rubber- or asphalt-based materials in durability at elevated temperature, they have one disadvantage or another as will be mentioned below.

Thus, Japanese Patent Publication No. 36492/1978 describes a vibration-damping material composed of vinyl polymer, cement and spherical sand but this material is not only inadequate in vibration-damping characteristic but has a limited durability and, therefore, is not satisfactory for practical use.

In Japanese Patent Application Laid-Open No. 52545/1978, there is disclosed a vibration-damping coating composition comprising an aqueous emulsion of a high polymer having a secondary transition point between 0° and 100° C., a flaky inorganic filler and a granular inorganic filler but while this coating material displays a satisfactory vibration-damping characteristic in a narrow temperature range in the vicinity of the secondary transition point, it has the disadvantage that, outside of that range, it offers only a poor vibration-damping performance.

Japanese Patent Application Laid-Open No. 133238/1978 and No. 133239/1978 each discloses a vibration-damping coating composition comprising incinerator ash, mica, short staples of organic or inorganic fiber and a synthetic resin or rubber emulsion. Although these compositions have the advantage of low product cost, they are low in vibration-damping quality and have poor resistance to water.

The coating material made up of a resin or rubber emulsion, mica powder and siliceous sand as described in Japanese Patent Application Laid-Open No. 32538/1979 and the coating material comprising a water-soluble or dispersible resin, a sludge recovered from a phosphate process, and a filler as disclosed in Japanese Patent Application Laid-Open No. 36341/1979 are also disadvantageous in that the temperature range ensuring a satisfactory vibration-damping performance is narrow.

Thus, just like the vibration-damping materials based on asphalt or rubber, the conventional damping compositions based on synthetic resin and inorganic filler are invariably unsatisfactory in that a satisfactory damping performance is obtainable only in a limited temperature range.

SUMMARY OF THE INVENTION

A primary object of this invention is to provide a coating composition which is suited for the prevention of vibrations and noise in cars, boats, buildings and other structures.

More specifically, the above object of the invention is to provide a coating composition which offers an excellent vibration-damping characteristic over a broad temperature range from room temperature to a high temperature and has excellent resistance to water, heat and weathering.

Another object of this invention is to provide a vibration-damping coating composition which does not contaminate the working environment and is easy to work with.

The aqueous dispersion type vibration-damping coating composition of this invention comprises, as three essential components thereof, a vinyl acetate polymer emulsion, an ethylene polymer in finely divided particulate or emulsion state and a flaky inorganic powder. The object of this invention can be accomplished only by the combination of these three different components.

DETAILED DESCRIPTION OF THE INVENTION

The polyvinyl acetate emulsion used according to this invention is not particularly critical as to composition, particle size, etc. but any of the common vinyl acetate polymers or emulsions can be utilized. Thus, the polyvinyl acetate emulsions which are generally employed usually contain about 30 to 65% of non-volatile matter and have a viscosity in the range of 300 to 80,000 centipoises at 30° C. and a particle size of about 0.01 to 1μ. As the protective colloid, there has been employed polyvinyl alcohol or a surfactant and, in some cases, a plasticizer has also been included. In the practice of this invention, any of such polyvinyl acetate emulsions can be advantageously utilized.

Further, it is desirable to incorporate a cross-linking agent into the emulsion, for the addition of a cross-linking agent to a polyvinyl acetate emulsion leads to improvements in the water- and weather-resistance of the coating film. The general or local swelling of the coated composition may occur when the coated composition free from a cross-linking agent is dried at high temperature as soon as the composition is coated. However, the swelling can be prevented by adding the cross-linking agent to the composition. Namely, the addition of a cross-linking agent is desirable for the vibration-damping coating compositions of present invention when it is to be used in wide conditions. Examples of such cross-linking agents are ammonium zirconylcarbonate, zirconium chloride, zirconium nitrate, zirconium lactate, sodium zirconium oxalate and other zirconium compounds; boric acid, borax and other boron compounds; titanyl sulfate, α-titanic acid, potassium titanium oxalate, titanium triethanolamine and other titanium compounds; formaldehyde, glyoxal and other aldehydes; methylolmelamine and other N-methylol compounds; divinyl sulfone, bis(β-hydroxyethyl)sulfone, disodium tris(β-sulfoethyl)sulfonium and other active vinyl compounds; epichlorohydrin, polyamide-polyamine-epichlorohydrin resins, glycidyl compounds of water-soluble polyhydric alcohols, such as glycerin, and other epoxy compounds; dicarboxylic acid chlorides, acid anhydrides and other dicarboxylic acid compounds; disulfite compounds; di- and tri-isocyanates and other polyisocyanates.

The polyethylene polymer in finely divided particulate or emulsion state as employed according to this invention is not especially critical as to the degree of polymerization, density and particle size but can be chosen with reference to the required vibration-damping performance and the intended use. Generally speaking, in order that high vibration-damping effects over a broad range extending to a very high temperature, as well as heat resistance, may be implemented in the coating film, it is desirable to use a polyethylene having a higher degree of polymerization and a higher density. Moreover, depending on the properties desired in the dried coating film, use is made of a polyethylene obtained by incorporating a certain amount of a different monomer as the comonomeric compound or a polyethylene resin modified by the incorporation of a certain functional group, for instance. Moreover, in order to achieve a uniform dispersion, it is desirable to employ a polyethylene which has been finely divided into sizes from about 0.1 μm to 1 mm in diameter.

A major feature of the vibration-damping coating composition according to this invention lies in the use of a polyethylene in finely divided particulate or emulsion state. The ethylene polymer contributes remarkably to vibration-damping characteristic at about 60° to 100° C. and imparts resistance to water, heat and weathering to the dried film. In order to obtain a high film strength, a heat treatment at a temperature beyond the melting point of the polyethylene is preferably conducted at the drying step or thereafter.

The flaky inorganic powder employed according to this invention includes, for example, mica, graphite, glass flake, vermiculite, talc, clay, etc. The grain size and aspect ratio of suck flaky inorganic powder are not especially critical. However, excessively large grains would interfere with the fluidity of the coating composition, causing a plugging of the spray nozzle or making the brushing or sheeting operation difficult, while if the grain size is too small, the viscosity of the coating composition will be too high for smooth spray application and contribute less to vibration-damping characteristic. Therefore, the size of flaky inorganic powder is selected from the range of 40 μm to 2 mm.

Among the various flaky inorganic powders mentioned above by way of example, mica is especially desirable in respect of film characteristics and production cost. The mixing ratio of vinyl acetate polymer, polyethylene and flaky inorganic powder can be selected with reference to requirements pertinent to the intended application. Usually, it is desirable to employ, per 100 weight parts of vinyl acetate polymer, 5 to 350 weight parts of ethylene polymer and 25 to 450 weight parts of flaky inorganic powder.

When, outside of the above range, only less than 5 weight parts of ethylene polymer is used, the film tends to be unsatisfactory in resistance to water, heat and weathering and tends to display a reduced vibration-damping characteristic at high temperatures. Conversely, when the amount of ethylene polymer is in excess of 350 weight parts, the film shows a satisfactory vibration-damping effect at high temperatures but it is difficult to produce a homogeneous coating composition and the fluidity of the composition is also affected.

When the proportion of flaky inorganic powder is less than 25 weight parts, the beneficial effect of the particular powder is not fully realized, while use of more than 450 weight parts of powder does not contribute to vibration-damping performance but, rather, reduces the fluidity of the composition to a marked extent.

The aqueous dispersion type vibration-damping coating composition of this invention can be produced by adding said ethylene polymer in finely divided particulate or emulsion state to said vinyl acetate polymer emulsion and then, adding said flaky inorganic powder in portions under constant stirring to obtain a homogeneous composition. If necessary, a plasticizer, cross-linking agent, antifoam, rheology modifier (e.g. thickener), water repellent agent, water, etc. may also be added to the composition.

It is also possible to further incorporate inorganic fillers, e.g. calcium carbonate, siliceous sand, calcium dihydrate, clay minerals, etc., high-density inorganic fillers, e.g. barium sulfate, iron oxide, iron powder, lead powder, etc., and inorganic or/and organic fibers such as rock wool, asbestos, glass fiber, metal fiber, vinylon short staples, polyester short staples, etc.

The aqueous dispersion type vibration-damping coating composition according to this invention can be applied to the surfaces of structural members such as those of cars, marine craft, automotive components, machines, building materials and so on by means of a suitable applicator such as a brush, spray gun, roller, etc. or by dipping. By any of such and other methods, the coating composition of this invention can be intimately deposited on the surfaces of structural members to damp their vibrations and reduce the consequent noise. The coating composition thus applied not only damps vibrations at and near atmosheric temperature but does so at high tempertures. Moreover, because the resulting film is highly resistant to heat, even prolonged exposure of the film to a high temperature atmosphere does not cause a hardening or embrittlement thereof. Thus the dynamic characteristics of the film are maintained virtually constant under such adverse conditions. The coating composition of this invention is, therefore, particularly suitable for such purposes as reducing the vibrations and noise emanating from the car or boat engines.

The following examples are further illustrative but by no means limitative of this invention.

EXAMPLE 1 AND CONTROL EXAMPLES A, B, C AND D

Table 1 shows the coating composition according to this invention as Example 1, the composition outside of the scope of this invention as Control Example A, and commercial compositions as Control Examples B, C and D. The compositions B and C are aqueous-type coating compositions while the composition D is a two-package composition consisting of a base component and a curing component. The formulations of those compositions are shown in Table 1.

TABLE 1

| Formulations (weight parts) | Example 1 | Control Example A | Control Example B | Control Example C | Control Example D |
|---|---|---|---|---|---|
| Polyvinyl acetate emulsion | 100 | 0 | 100 | 100 | 0 |
| Ethylene-vinyl acetate copolymer emulsion (ethylene content 18 wt. %) | 0 | 100 | 0 | 0 | 0 |
| Epoxy resin | 0 | 0 | 0 | 0 | 100 |
| Powdered polyethylene | 50 | 50 | 0 | 0 | 0 |
| Mica | 100 | 100 | 0 | 0 | 90 |
| Clay | 0 | 0 | 70 | 0 | 0 |
| Calcium carbonate plus talc | 0 | 0 | 0 | 54 | 0 |

The compositions of Example 1 and Control Examples A, B and C were each applied to the surface of an iron plate 0.8 mm thick by means of a spray gun and allowed to dry at room temperature for 2 days. Then, the film was dried thoroughly in a hot-current dryer at 130° C. for 1 hour to prepare a test piece having a 1.6 mm thick coating film. As for Control Example D, the base component and curing component were admixed at room temperature and coated onto a similar iron plate by means of a coating spatula and cured in situ at 100° C. to prepare a test specimen.

To measure the vibration-damping performance of each test piece, the loss factor ($\eta_{comb}$) for the iron plate-coating composit was determined by the resonance method with the aid of the complex elasticity measuring apparatus of Brüel & Kjaer. It is generally acknowledged that a vibration-damping material deserves the name only if its loss factor is at least 0.05.

The water resistance of each test piece was evaluated according to the following schema: after immersion in running water at room temperature for one week, no change at all ◯; partial loss of film △ and substantially total loss X.

The heat resistance of each test piece was evaluated according to the following criteria: after standing in vertical position at 200° C. for one hour, no change at all ◯; local swelling or slight running (sagging) △, and marked swelling or/and marked running X.

The weather resistance of each test piece was tested by a 500-hour exposure test using a Sunshine Weather-O-Meter and evaluated according to the schema: no change at all ◯, partial loss of film △ and substantially total loss of film X.

The results of the above tests are set forth in Table 2.

TABLE 2

| | | Example 1 | Control Example A | Control Example B | Control Example C | Control Example D |
|---|---|---|---|---|---|---|
| loss factor (500 Hz, thickness ratio 2.0) | 20° C. | 0.13 | 0.16 | 0.075 | 0.20 | 0.01 |
| | 80° C. | 0.12 | 0.060 | 0.027 | 0.017 | 0.12 |
| Water resistance | | ◯ | ◯ | △ | X | ◯ |
| Heat resistance | | ◯ | ◯ | ◯ | △ | ◯ |
| Weather resistance | | ◯ | ◯ | △ | △ | ◯ |

The following facts can be easily deduced from the data presented in Table 2. The composition of Control Example A shows an insufficient vibration-damping effect at high temperature although it is satisfactory in resistance to water, heat and weathering and in vibration-damping effect at and near atmospheric temperature. Conversely, the composition of Control Example D shows only an inadequate vibration-damping effect at and near room temperature although its vibration-damping characteristic at high temperature is satisfactory. The compositions of Control Examples B and C are poor in resistance to water and weathering and also inadquate in vibration-damping performance.

In contrast, the composition of Example 1 according to this invention displays an excellent vibration-damping performance both at room temperature and at high temperature, and is also satisfactory in resistance to water, heat and weathering.

EXAMPLE 2 AND 3 & CONTROL EXAMPLE E

Table 3 shows compositions according to this invention as Examples 2 and 3, and a composition not failling within the scope of the invention as Control Example E. The formulations of these compositions are shown in Table 3.

TABLE 3

| | | Example 2 | Example 3 | Control Example E |
|---|---|---|---|---|
| Formulation (weight parts) | Polyvinyl acetate emulsion | 100 | 100 | 100 |
| | Powdered polyethylene | 34 | 100 | 0 |
| | Mica | 340 | 340 | 340 |
| loss factor (500 Hz, thickness ratio 2.0) | 20° C. | 0.10 | 0.09 | 0.11 |
| | 80° C. | 0.070 | 0.08 | 0.010 |
| Water resistance | | ◯ | ◯ | X |
| Heat resistance | | ◯ | ◯ | △ |
| Weather resistance | | ◯ | ◯ | X |

The compositions indicated in Table 3 were each coated onto an iron plate 0.8 mm thick by means of a spray gun and allowed to dry at room temperature for 2 days. Then, the film was further dried thoroughly in a hot-current dryer at 130° C. for one hour to prepare a test piece with a coating film thickness of 1.6 mm. The evaluation results for these test pieces are also shown in Table 3. It is apparent from Table 3 that the coating composition of this invention has a broad vibration-damping temperature range and is also superior in resistance to water, heat and weathering.

Thus, this invention provides a vibration-damping coating composition which displays a high vibration-damping characteristic over a broad temperature range from low to high temperature and also has other qualities desired in coating films.

EXAMPLE 4 AND 5

Two compositions illustrated in Table 4, included in the present invention were prepared. These compositions were each applied to the surface of an iron plate 1.6 mm thick by means of a spray gun and allow to dry for seven days at room temperature. These samples were put into the water resistance test. Other samples were prepared by drying coated samples at 150° C. as soon as the compositions were each applied to the iron plate. The results are illustrated in Table 4. In the drying nature of Table 4, O denotes normally dryable sample and X denotes the sample having a swelled coated layer.

TABLE 4

|  | Example 4 | Example 5 |
| --- | --- | --- |
| polyvinyl acetate emulsion | 100 | 100 |
| polyethylene powder | 40 | 40 |
| mica | 350 | 350 |
| ammonium zirconylcarbonate | 10 | 0 |
| water resistance | O | O |
| drying nature at 150° C. | O | X |

The water resistance of Example 4 sample which contains a cross-linking agent was better than that of Example 5 sample which contained no cross-linking agents. The sample of Example 4 resisted streaming water for a long time and it resisted rubbing after soaking in water. And more, the sample of Example 4 could be dried well at a high temperature as soon as the composition was applied to the iron surface.

Having now fully described the invention, it will be apparent to one of ordinary skill in the art that many changes and modifications can be made thereto without departing from the spirit or scope of the invention as set forth herein.

What is claimed is:

1. An aqueous dispersion type vibration-damping composition comprising, as essential components thereof, (a) a vinyl acetate polymer emulsion, (b) an ethylene polymer in finely divided particulate or emulsion state, (c) a flaky inorganic filler, and (d) ammonium zirconylcarbonate as a cross-linking agent for said vinyl acetate polymer emulsion.

* * * * *

UNITED STATES PATENT AND TRADEMARK OFFICE
CERTIFICATE OF CORRECTION

PATENT NO. : 4,325,858
DATED : April 20, 1982
INVENTOR(S) : Koichi Saito et. al.

It is certified that error appears in the above—identified patent and that said Letters Patent is hereby corrected as shown below:

On the title page

Please correct the Foreign Application Priority Data as follows:

[30] -- Foreign Application Priority Data: Aug. 16, 1979

[JP] Japan ..........54-104718 --.

Signed and Sealed this

Thirty-first Day of August 1982

[SEAL]

Attest:

GERALD J. MOSSINGHOFF

Attesting Officer

Commissioner of Patents and Trademarks